(12) United States Patent
Yanase et al.

(10) Patent No.: US 8,915,768 B2
(45) Date of Patent: Dec. 23, 2014

(54) METHOD OF PHASING THREADED GRINDING STONE, AS WELL AS DEVICE THEREFOR

(75) Inventors: Yoshikoto Yanase, Ritto (JP); Kazuyuki Ishizu, Ritto (JP); Tomohito Tani, Ritto (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 448 days.

(21) Appl. No.: 13/498,368

(22) PCT Filed: Sep. 28, 2009

(86) PCT No.: PCT/JP2009/066761
§ 371 (c)(1),
(2), (4) Date: May 23, 2012

(87) PCT Pub. No.: WO2011/036790
PCT Pub. Date: Mar. 31, 2011

(65) Prior Publication Data
US 2012/0238185 A1    Sep. 20, 2012

(51) Int. Cl.
    *B24B 49/00*    (2012.01)
(52) U.S. Cl.
    USPC ....... 451/9; 451/10; 451/11; 451/56; 451/443
(58) Field of Classification Search
    USPC ................................ 451/8, 9, 10, 11, 56, 443
    See application file for complete search history.

(56) References Cited

U.S. PATENT DOCUMENTS

| | | | | |
|---|---|---|---|---|
| 4,821,460 | A | * | 4/1989 | Wegmann ........................ 451/26 |
| 4,920,945 | A | * | 5/1990 | Wedeniwski ............... 125/11.03 |
| 8,678,880 | B2 | * | 3/2014 | Ito et al. ........................... 451/10 |
| 2006/0014474 | A1 | | 1/2006 | Yanase et al. |
| 2012/0190274 | A1 | * | 7/2012 | Ito et al. .......................... 451/11 |

FOREIGN PATENT DOCUMENTS

| | | |
|---|---|---|
| JP | 5-138438 A | 6/1993 |
| JP | 9-174330 A | 7/1997 |

(Continued)

OTHER PUBLICATIONS

Japanese Office Action 2008-197520 dated Dec. 13, 2011 with English translation.

*Primary Examiner* — Eileen P. Morgan
(74) *Attorney, Agent, or Firm* — Birch, Stewart, Kolasch & Birch, LLP (57) ABSTRACT

Provided is a method of phasing a threaded grinding stone, as well as a device therefor, the aforementioned method and device being such that contact or non-contact of a threaded grinding stone with a disk dresser can be detected with high accuracy, with the result that the phasing of the threaded grinding stone can be accurately performed. For the purpose of achieving the above, a threaded grinding stone (14) is phased with respect to a disk dresser (32) prior to the engagement of the threaded grinding stone (14) with the disk dresser (32) during dressing. In performing this phasing, it is determined whether or not the threaded grinding stone (14) contacted the disk dresser (32), on the basis of a voltage (V) which is commensurate with the amplitude of the elastic wave generated in the threaded grinding stone (14) at the time when the threaded grinding stone (14) contacted the disk dresser (32). In a case where the voltage (V) does not exceed a threshold value (Vo) even if the threaded grinding stone (14) contacts the disk dresser (32), then the rotational speed of the disk dresser (32) is increased, with the result that there is forcibly created a situation where it is determined that contact occurred. Subsequently, the threaded grinding stone (14) is positioned, on the basis of the resulting phase thereof, in an intermediate phase where the aforementioned engagement is feasible.

3 Claims, 6 Drawing Sheets (56) References Cited

FOREIGN PATENT DOCUMENTS

| JP | 2000-263440 A | 9/2000 |
| JP | 2000-326141 A | 11/2000 |
| JP | 2003-1650230 A | 6/2003 |
| JP | 2004-255504 A | 9/2004 |
| JP | 2006-26789 A | 2/2006 |
| JP | 2007-260879 A | 10/2007 |
| JP | 2009-196022 A | 9/2009 |

* cited by examiner

METHOD OF PHASING THREADED GRINDING STONE, AS WELL AS DEVICE THEREFOR

TECHNICAL FIELD

The present invention relates to a phasing method and a phasing device for a threaded grinding wheel used to phase a threaded grinding wheel with a dresser ahead of the meshing of the threaded grinding wheel with the dresser at the time of dressing.

BACKGROUND ART

Heretofore, gear grinding machines are provided to efficiently finish the tooth surfaces of a workpiece, which is a heat-treated gear to be machined, by grinding the workpiece with a grinding wheel, which is a grinding tool. In such a gear grinding machine, the workpiece is ground in a state in which the grinding wheel and the workpiece are being rotated in synchronization while meshing with each other. Accordingly, insufficient precision of meshing may cause uneven grinding on the tooth surfaces of the workpiece and may reduce the life of the grinding wheel due to an excessive load thereon.

For the above-described reasons, in a gear grinding machine of this type, phasing is performed ahead of meshing at the time of grinding in order to mesh a grinding wheel with a workpiece with high precision. In the phasing, the grinding wheel and the workpiece are positioned so that the cutting edges (peaks and valleys) of the grinding wheel and the roots (peaks and valleys) of the teeth of the workpiece have an appropriate phase relationship. Such a phasing method for phasing a grinding wheel with a workpiece is disclosed in, for example, Patent Document 1.

PRIOR ART DOCUMENT

Patent Document

Patent Document 1: Japanese Patent Application Publication No. Hei 5-138438

SUMMARY OF THE INVENTION

Problems to be Solved by the Invention

In the above-described conventional phasing method, a grinding wheel is slid on a workpiece in the axial direction thereof, and an AE (acoustic emission) sensor detects the instant of occurrence of contact and the instant of loss of contact when the grinding wheel crosses a thread groove of the workpiece. The workpiece is moved in the axial direction thereof so that the grinding wheel faces an intermediate position in the thread groove which is found based on the results of the detection. In this way, the grinding wheel and the workpiece are phased with each other. However, in the conventional method, the precise detection of contact or non-contact of the grinding wheel with the workpiece is difficult because the detection is performed in an instant.

In addition, in the gear grinding machine, it is considered that the same problem occurs not only in the phasing of the grinding wheel with the workpiece during grinding but also in the phasing of the grinding wheel with a dresser during dressing, because the workpiece is ground by use of the grinding wheel dressed by the dresser.

Accordingly, the present invention has been made to solve the above-described problems, and an object of the present invention is to provide a phasing method and a phasing device for a threaded grinding wheel which enable detection of contact or non-contact of the threaded grinding wheel with high precision and precise phasing of the threaded grinding wheel.

Means for Solving the Problems

A phasing method for a threaded grinding wheel according to the first invention that solves the problems is a phasing method for a threaded grinding wheel, in which the threaded grinding wheel is phased with a dresser prior to the engagement of the threaded grinding wheel with the dresser during dressing, the method characterized by comprising:
 rotating the threaded grinding wheel in one direction;
 detecting elastic waves generated when one of thread surfaces of the threaded grinding wheel comes into contact with a corresponding one of blade surfaces of the dresser;
 increasing the number of rotations of the dresser until a measured value on one direction side corresponding to the elastic waves exceeds a predetermined value in a case where the measured value on the one direction side does not exceed the predetermined value even if the threaded grinding wheel comes into contact with the dresser;
 storing a phase on the one direction side of the threaded grinding wheel once the measured value on the one direction side exceeds the predetermined value;
 rotating the threaded grinding wheel in the other direction;
 detecting elastic waves generated when the other one of the thread surfaces of the threaded grinding wheel comes into contact with the other one of the blade surfaces of the dresser;
 increasing the number of rotations of the dresser until a measured value on the other direction side corresponding to the elastic waves exceeds the predetermined value in a case where the measured value on the other direction side does not exceed the predetermined value even if the threaded grinding wheel comes into contact with the dresser;
 storing a phase on the other direction side of the threaded grinding wheel once the measured value on the other direction side exceeds the predetermined value; and
 positioning the threaded grinding wheel at a phase where the engagement is feasible, on the basis of the phase on the one direction side and the phase on the other direction side of the threaded grinding wheel.

A phasing device for a threaded grinding wheel according to the second invention that solves the problems is a phasing device for a threaded grinding wheel, with which the threaded grinding wheel is phased with a dresser prior to the engagement of the threaded grinding wheel with the dresser during dressing, the device characterized by comprising:
 detection means for detecting elastic waves generated when the threaded grinding wheel rotates and comes into contact with the dresser;
 determination means for determining that the threaded grinding wheel has come into contact with the dresser in a case where a measured value corresponding to the elastic waves detected by the detection means exceeds a predetermined value;
 dresser rotation number setting means for setting the number of rotations of the dresser so that the measured value exceeds the predetermined value, in a case where the threaded grinding wheel comes into contact with the dresser and the measured value does not exceed the predetermined value; and
 grinding wheel phase control means for positioning the threaded grinding wheel at a phase where the engagement is feasible, on the basis of the phase of the threaded grinding wheel when the detection means determines that the contact has occurred.

A phasing device for a threaded grinding wheel according to the third invention that solves the problems is characterized in that the dresser rotation number setting means increases the number of rotations of the dresser in a stepwise manner.

Effects of the Invention

In the phasing method and the phasing device for a threaded grinding wheel according to the present invention, a determination is made whether or not the threaded grinding wheel has come into contact with the disc dresser, on the basis of a measured value corresponding to elastic waves generated in the threaded grinding wheel when the threaded grinding wheel comes into contact with the dresser. In a case where the measured value does not exceed a predetermined value even if the threaded grinding wheel comes into contact with the dresser, the number of rotations of the dresser is increased. Accordingly, contact or non-contact of the threaded grinding wheel can be detected with high precision, and thus the threaded grinding wheel can be phased with the dresser precisely.

MODE FOR CARRYING OUT THE INVENTION

Hereinafter, a phasing method and a phasing device for a threaded grinding wheel according to the present invention will be described in detail with reference to the drawings.
Embodiment A gear grinding machine 1 to which the phasing device for a threaded grinding wheel according to the present invention is applied is used to grind a workpiece (gear to be machined) W as a material of an internal gear with a barrel-shaped threaded grinding wheel 14 as shown in FIG. 2. Further, the gear grinding machine 1 has the dressing function of dressing the threaded grinding wheel 14 with a disc dresser 32 as shown in FIG. 1.

Figure 1:
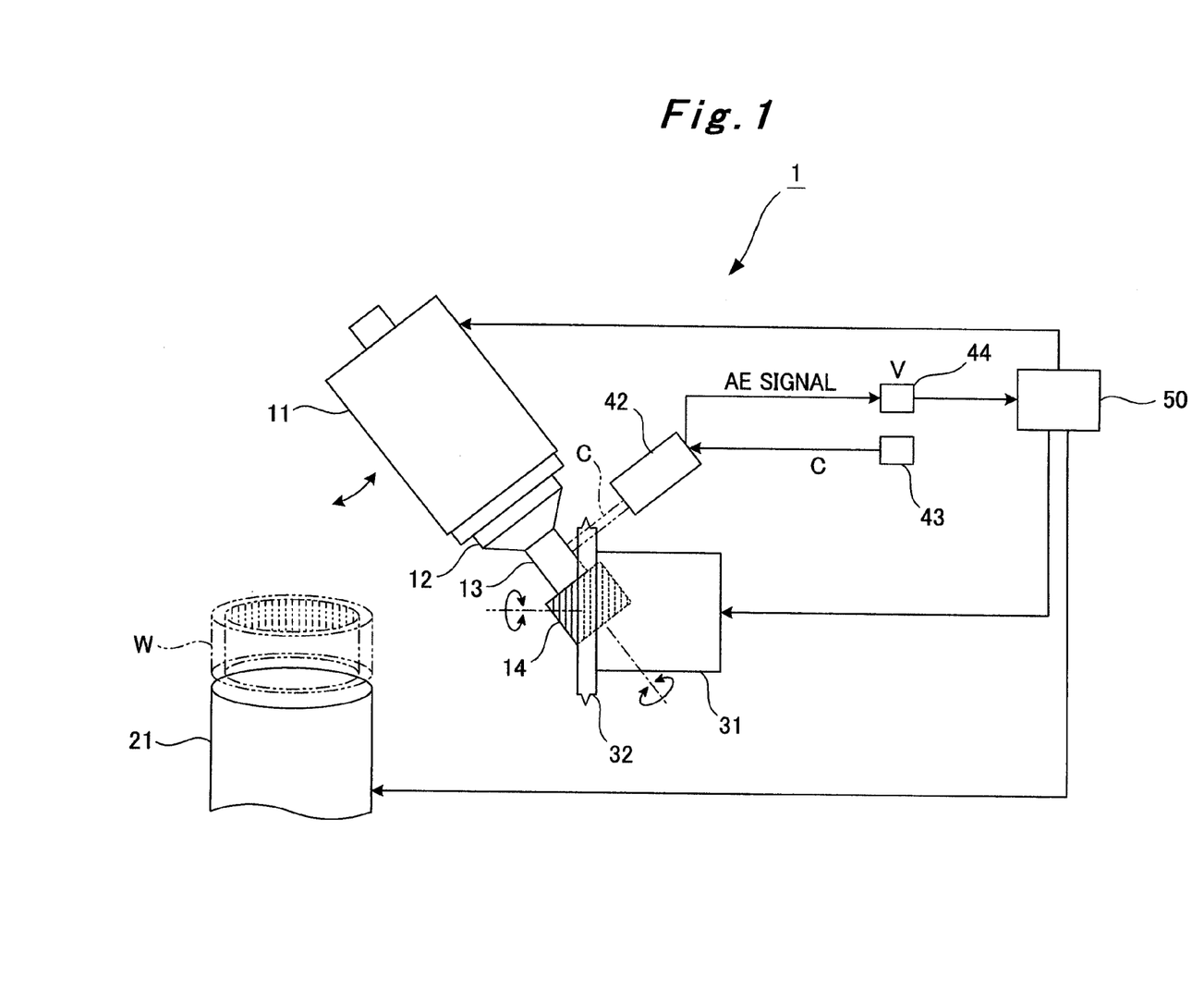
FIG. 1 is a schematic diagram showing the configuration of a phasing device for a threaded grinding wheel according to one example of the present invention, and shows a disc dresser which is dressing a threaded grinding wheel.
Figure 2:
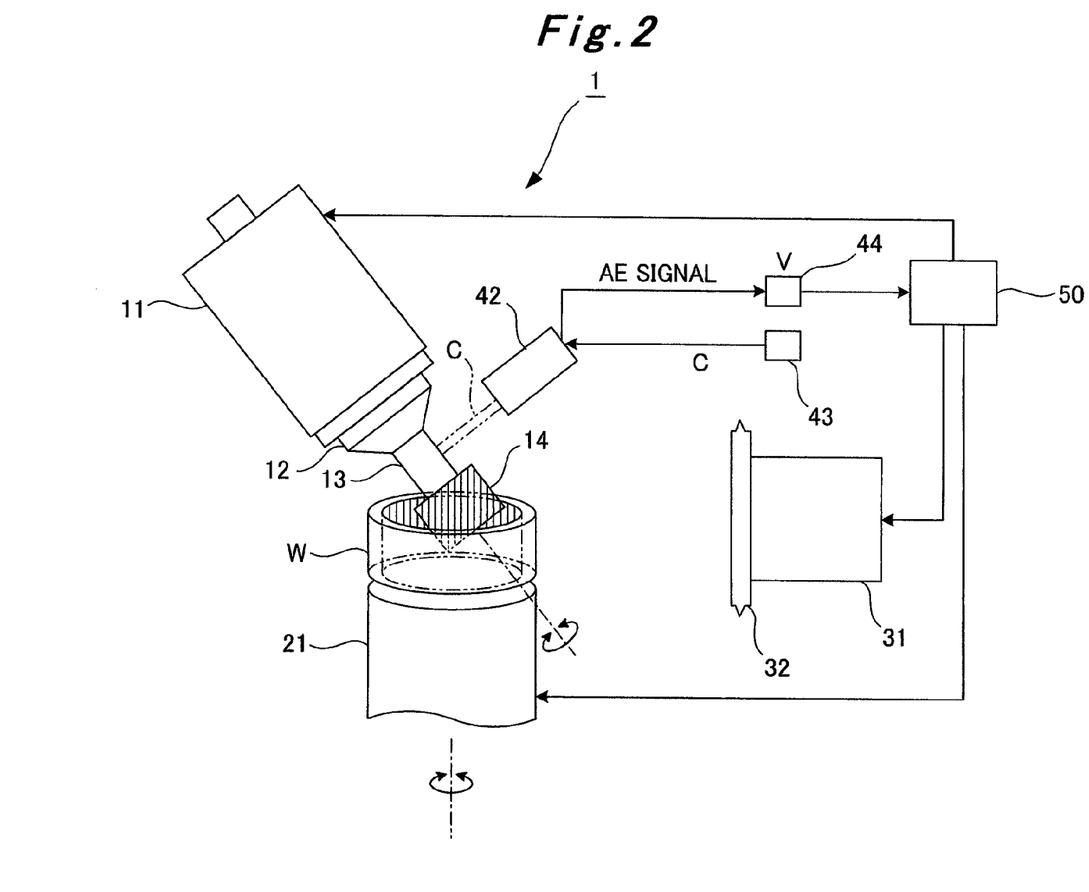
FIG. 2 is a view showing the threaded grinding wheel which is grinding the workpiece.
Figure 3:
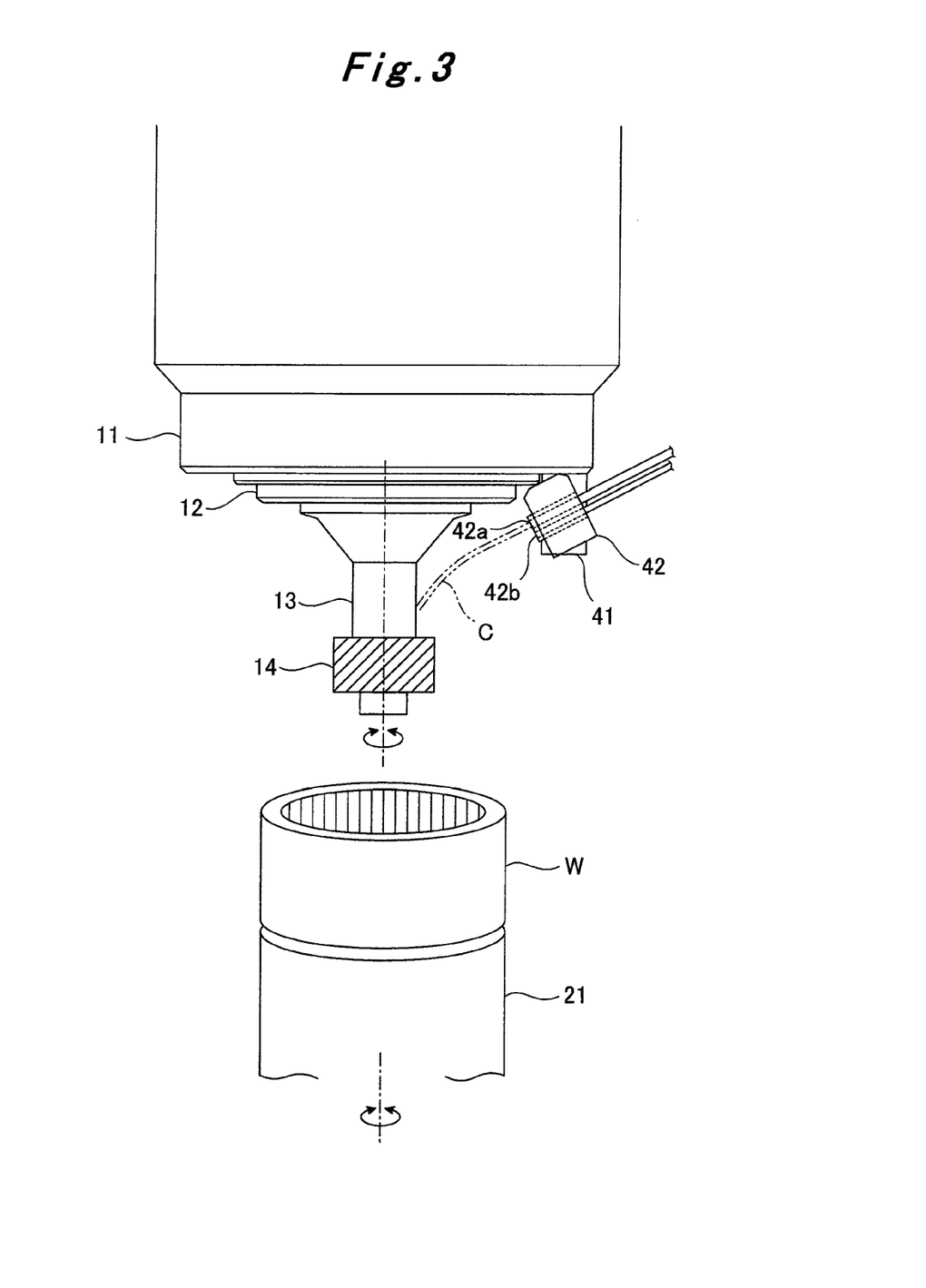
FIG. 3 is a view showing a mounting structure of an AE fluid sensor.

As shown in FIGS. 1 to 3, a grinding wheel head 11 is movably and turnably supported in the gear grinding machine 1. A spindle 12 is rotatably supported by this grinding wheel head 11. At the tip of this spindle 12, a grinding wheel arbor 13 is formed. Further, to the tip of the grinding wheel arbor 13, the threaded grinding wheel 14 is removably attached. Thus, driving the grinding wheel head 11 causes the threaded grinding wheel 14 to be rotationally driven through the grinding wheel arbor 13 of the spindle 12.

In front of the grinding wheel head 11, a rotary table 21 is rotatably supported. To an upper surface of this rotary table 21, the workpiece W is removably attached through an unillustrated installation jig. Thus, driving the rotary table 21 causes the workpiece W to be rotationally driven.

At a side of the rotary table 21, a dresser drive unit 31 is movably supported. To this dresser drive unit 31, the disc dresser 32 is removably attached. Thus, driving the dresser drive unit 31 causes the disc dresser 32 to be rotationally driven.

On the tip surface of the grinding wheel head 11, an AE (Acoustic Emission) fluid sensor (detection means) 42 of an acoustic emission type is supported through a bracket 41. This AE fluid sensor 42 is configured to detect, through jetted fluid, elastic waves generated in a material due to vibration, friction, and the like, and to process the elastic waves as an AE signal. The AE fluid sensor 42 has a jet orifice 42a for jetting coolant C as the fluid to a predetermined measurement point on the grinding wheel arbor 13 and a detection unit 42b for detecting elastic waves propagating through the coolant C from the measurement point. Furthermore, the jet orifice 42a of the AE fluid sensor 42 has a coolant tank 43 connected thereto, and the detection unit 42b has an AE sensor amplifier 44 connected thereto.

It should be noted that the coolant C supplied from the coolant tank 43 to the AE fluid sensor 42 is, for example, grinding oil, and that the coolant pressure and the jetting flow rate of the coolant can be adjusted in accordance with the distance between the AE fluid sensor 42 and the measurement point.

Specifically, in the AE fluid sensor 42, elastic waves generated in the threaded grinding wheel 14 by jetting the coolant C supplied from the coolant tank 43 from the jet orifice 42a to the measurement point on the grinding wheel arbor 13 are detected by the detection unit 42b through the coolant C, and these detected elastic waves are then inputted as an AE signal to the AE sensor amplifier 44. In the AE sensor amplifier 44, as shown in FIG. 4, the inputted AE signal is converted into voltage V (measured value), and this voltage V is displayed as needed.

Moreover, in the gear grinding machine 1, an NC unit (determination means, dresser rotation number setting means, grinding wheel phase control means) 50 is provided. This NC unit 50 is connected to, for example, the grinding wheel head 11, the rotary table 21, the dresser drive unit 31, the AE sensor amplifier 44, and the like. The NC unit 50 controls the grinding of the workpiece W with the threaded grinding wheel 14 and the dressing of the threaded grinding wheel 14 with the disc dresser 32 based on inputted workpiece specifications and machining conditions. Ahead of meshing (gear meshing operation) at the time of the above-described grinding or dressing, the NC unit 50 determines whether or not there is a contact between the threaded grinding wheel 14 and the workpiece W or the disc dresser 32, based on the amplitude of elastic waves detected by acoustic emission fluid sensor 42, thus phasing the threaded grinding wheel 14.

The grinding of the workpiece W with the threaded grinding wheel 14 starts with moving the threaded grinding wheel 14 into the workpiece W attached to the rotary table 21 as shown in FIG. 2. After the threaded grinding wheel 14 is moved to the workpiece W side, the phasing between the threaded grinding wheel 14 and the workpiece W is roughly performed (rough phasing) before the threaded grinding wheel 14 and the workpiece W are meshed with each other so that the thread tips of the threaded grinding wheel 14 and the tooth tips of the workpiece W do not interfere with each other. In such a roughly phase-matched state, the threaded grinding wheel 14 and the workpiece W are rotated in synchronization, and the coolant C is jetted from the jet orifice 42a of the AE fluid sensor 42 toward the measurement point on the grinding wheel arbor 13. Then, the detection of elastic waves generated in the threaded grinding wheel 14 is started by the detection unit 42b of the AE fluid sensor 42.

Figure 4:
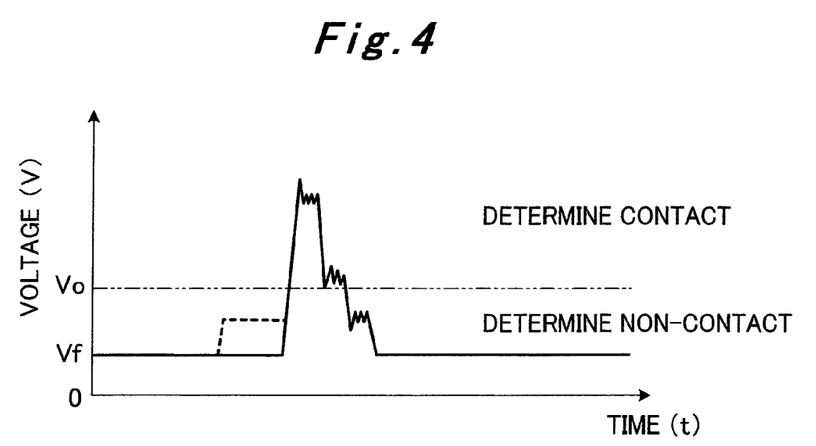
FIG. 4 is a view showing the change of voltage when the AE fluid sensor detects elastic waves generated in the threaded grinding wheel.

When the detection of elastic waves by the AE fluid sensor 42 is started as described above, the AE sensor amplifier 44 converts the inputted AE signal into the voltage V to display the change thereof with time as shown in FIG. 4. It should be noted that at the same time as the detection of elastic waves by the AE fluid sensor 42 is started, the voltage V is measured as the maximum voltage Vf of the threaded grinding wheel 14 in non-contact conditions, and a threshold value Vo larger than this voltage Vf is automatically set. This threshold value Vo is used when an undermentioned contact determination is made on the threaded grinding wheel 14.

Subsequently, only the rotation speed (number of rotations) of the workpiece W is increased to cause a loss of synchronization between the threaded grinding wheel 14 and the workpiece W. Thus, one of tooth surfaces of the workpiece Ware brought into contact with corresponding one of thread surfaces of the threaded grinding wheel 14. As a result, elastic waves generated in the threaded grinding wheel 14 due to the contact are propagated to the grinding wheel arbor 13. These elastic waves propagated to the grinding wheel arbor 13 are detected by the AE fluid sensor 42 through the coolant C. At this time, as shown in FIG. 4, in the AE sensor amplifier 44, the waveform of the voltage V changes in accordance with the inputted AE signal. When this voltage V (Vf) exceeds the predetermined threshold value Vo, the NC unit 50 determines that the workpiece W has come into contact with the threaded grinding wheel 14, and stores the phase of the threaded grinding wheel 14 of this time.

On the other hand, only the rotation speed (number of rotations) of the workpiece W is decreased to cause a loss of synchronization between the threaded grinding wheel 14 and the workpiece W. Thus, the other one of the tooth surfaces of the workpiece W are brought into contact with the other one of the thread surfaces of the threaded grinding wheel 14. As a result, elastic waves generated in the threaded grinding wheel 14 due to the contact are propagated to the grinding wheel arbor 13. These elastic waves propagated to the grinding wheel arbor 13 are detected by the AE fluid sensor 42 through the coolant C. At this time, as shown in FIG. 4, in the AE sensor amplifier 44, the waveform of the voltage V changes in accordance with the inputted AE signal. When this voltage V (Vf) exceeds the predetermined threshold value Vo, the NC unit 50 determines that the workpiece W has come into contact with the threaded grinding wheel 14, and stores the phase of the threaded grinding wheel 14 of this time.

Then, the NC unit 50 finds an intermediate phase from the two stored phases of the threaded grinding wheel 14. The intermediate phase is between the two stored phases. After that, phasing is performed precisely (precise phasing) by positioning the threaded grinding wheel 14 so that the phase thereof is the intermediate phase. Subsequently, in such a precisely phase-matched state, the threaded grinding wheel 14 is meshed with the workpiece W, and the threaded grinding wheel 14 and the workpiece W are rotated in synchronization. As a result, the one of the tooth surfaces of the workpiece W are ground by the corresponding one of the thread surfaces of the threaded grinding wheel 14.

What should be noted here is that the use of the threaded grinding wheel 14 to grind a certain number of workpieces W causes a decrease in sharpness of the threaded grinding wheel 14 due to the wear of the thread surfaces thereof. To address this decrease, the dressing of the threaded grinding wheel 14 needs to be carried out on a regular basis with the disc dresser 32.

The dressing of the threaded grinding wheel 14 with the disc dresser 32 starts with moving the threaded grinding wheel 14 to the disc dresser 32 side as shown in FIG. 1. After that, the phasing between the threaded grinding wheel 14 and the disc dresser 32 is roughly performed (rough phasing) before the threaded grinding wheel 14 and the disc dresser 32 are meshed with each other so that the thread tips of the threaded grinding wheel 14 and the blade edge of the disc dresser 32 do not interfere with each other. Subsequently, in such a roughly phase-matched state, the disc dresser 32 is rotated while the rotation of the threaded grinding wheel 14 is kept stopped, and the coolant C is jetted from the jet orifice 42a of the AE fluid sensor 42 toward the measurement point on the grinding wheel arbor 13. Then, the detection of elastic waves generated in the threaded grinding wheel 14 is started by the detection unit 42b of the AE fluid sensor 42.

Note that the number of rotations of the disc dresser 32 at this time is set to an intermediate value between the minimum number of rotations and the maximum number of rotations. The minimum number of rotations is the number that allows an operator to hear contact sound when the threaded grinding wheel 14 comes into contact with the disc dresser 32. The maximum number of rotations is the number that allows any of the threaded grinding wheel 14 and the disc dresser 32 not to be broken when the threaded grinding wheel 14 comes into contact with the disc dresser 32.

When the detection of elastic waves by the AE fluid sensor 42 is started as described above, the AE sensor amplifier 44 converts the inputted AE signal into the voltage V to display the change thereof with time as shown in FIG. 4. It should be noted that at the same time as the detection of elastic waves by the AE fluid sensor 42 is started, the voltage V is measured as the maximum voltage Vf of the threaded grinding wheel 14 in non-contact conditions, and a threshold value Vo (predetermined value) larger than this voltage Vf is automatically set. This threshold value Vo is used when an undermentioned contact determination is made on the threaded grinding wheel 14.

Then, the threaded grinding wheel 14 is rotated forward so that one thread surfaces thereof are brought into contact with one blade surface of the disc dresser 32. As a result, elastic waves generated in the threaded grinding wheel 14 due to the contact are propagated to the grinding wheel arbor 13. These elastic waves propagated to the grinding wheel arbor 13 are detected by the AE fluid sensor 42 through the coolant C. At this time, as shown in FIG. 4, in the AE sensor amplifier 44, the waveform of the voltage V changes in accordance with the inputted AE signal. When this voltage (a measured value on one direction side) V exceeds the predetermined threshold value Vo, the NC unit 50 determines that the threaded grinding wheel 14 has come into contact with the disc dresser 32, and stores the phase (a phase on the one direction side) of the threaded grinding wheel 14 of this time.

Subsequently, the threaded grinding wheel 14 is rotated reversely so that the other thread surfaces thereof are brought into contact with the other blade surface of the disc dresser 32. As a result, elastic waves generated in the threaded grinding wheel 14 due to the contact are propagated to the grinding wheel arbor 13. These elastic waves propagated to the grinding wheel arbor 13 are detected by the AE fluid sensor 42 through the coolant C. At this time, as shown in FIG. 4, in the AE sensor amplifier 44, the waveform of the voltage V changes in accordance with the inputted AE signal. When this voltage (a measured value on other direction side) V exceeds the predetermined threshold value Vo, the NC unit 50 determines that the threaded grinding wheel 14 has come into contact with the disc dresser 32, and stores the phase (a phase on the other direction side) of the threaded grinding wheel 14 of this time.

Then, the NC unit 50 finds an intermediate phase from the two stored phases of the threaded grinding wheel 14. The intermediate phase is intermediate between the two stored phases. After that, phasing is performed precisely (precise phasing) by positioning the threaded grinding wheel 14 so that the phase thereof is the intermediate phase. Subsequently, in such a precisely phase-matched state, the threaded grinding wheel 14 is meshed with the disc dresser 32, and the disc dresser 32 is rotated. As a result, the thread surfaces of the threaded grinding wheel 14 are dressed by the blade surfaces of the disc dresser 32.

It should be noted that though the workpiece W as a material of an internal gear has been employed in this example, a workpiece as a material of an external gear may be employed. Moreover, though the common threshold voltage Vo has been used in a contact determination between the threaded grinding wheel 14 and the workpiece W or the disc dresser 32, different threshold values may be used. With respect to these threshold values, different values can be set for different materials, different machining conditions, and the like.

Here, when the threaded grinding wheel 14 comes into contact with the disc dresser 32 by rotating forward or reversely as described above, in a case where the voltage V does not exceed the threshold value Vo even after a predetermined time has passed although the threaded grinding wheel 14 are in contact with the disc dresser 32, the NC unit 50 performs control so that the number of rotations N of the disc dresser 32 increases. Specifically, as shown by the dotted line in FIG. 4, in a case where the measured voltage V exceeds the maximum voltage Vf in non-contact conditions and is equal to or lower than the threshold value Vo, the number of rotations N of the disc dresser 32 is increased in a stepwise manner at a constant rate until the voltage V exceeds the threshold value Vo (see FIG. 5), and thereby the elastic waves of the threaded grinding wheel 14 are forcibly amplified. This improves the detection sensitivity of the AE fluid sensor 42 and ensures the contact determination to be made on the threaded grinding wheel 14.

Figure 5:
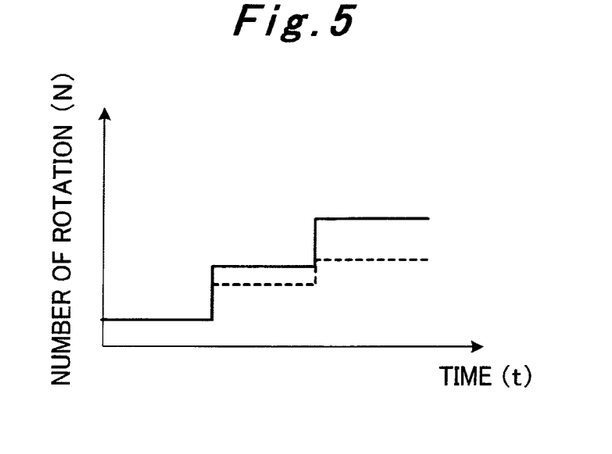
FIG. 5 is a view showing the change of the number of rotations of the disc dresser.

With regard to the method for setting the number of rotations N of the disc dresser 32 in a stepwise manner, the increase rate of the number of rotations N may be set as constant as shown by the solid line in FIG. 5, or may be set as variable. For example, the increase rate may be set to be gradually smaller as shown by the dotted line in FIG. 5.

Figure 6:
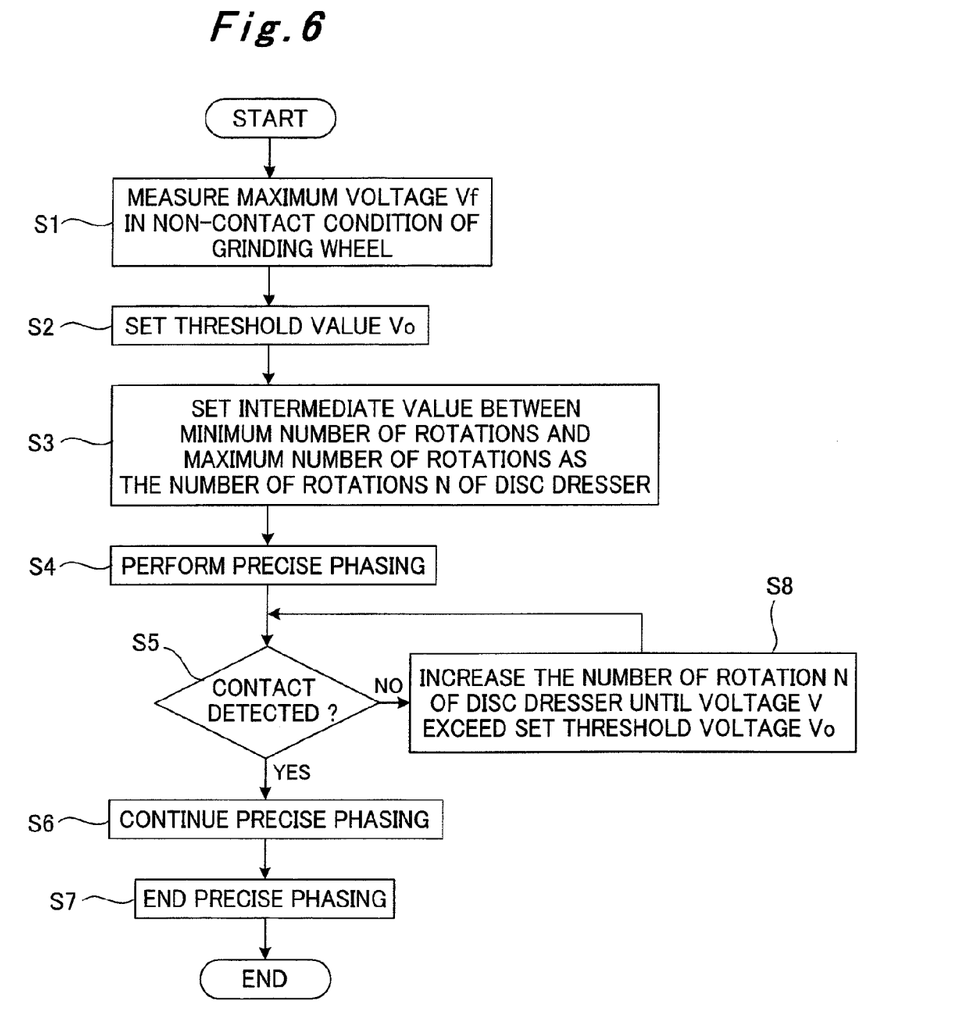
FIG. 6 is a flowchart illustrating a process of phasing the threaded grinding wheel with the disc dresser.

Next, a process of setting the number of rotations of the disc dresser 32 by the NC unit 50 is described using FIG. 6.

First, the maximum voltage Vf in non-contact conditions of the threaded grinding wheel 14 is measured in Step S1, and next in Step S2, the threshold value Vo is set to a value larger than the maximum voltage Vf measured in Step S1, the threshold value Vo used for determining that the threaded grinding wheel 14 has come into contact with the disc dresser 32.

Then, in Step S3, an intermediate value between the minimum number of rotations and the maximum number of rotations is set as the number of rotations of the disc dresser 32. The minimum number of rotations is the number that allows an operator to hear contact sound when the threaded grinding wheel 14 comes into contact with the disc dresser 32. The maximum number of rotations is the number that allows the threaded grinding wheel 14 not to be broken when the threaded grinding wheel 14 comes into contact with the disc dresser 32. After that, in Step S4, phasing of the threaded grinding wheel 14 with the disc dresser 32 is started.

Next, in Step S5, a determination is made whether or not the threaded grinding wheel 14 has come into contact with the disc dresser 32. If YES in Step S5, the phasing of the threaded grinding wheel 14 is continued in Step S6, and the phasing ends in Step S7. If NO in Step S5, the number of rotations N of the disc dresser 32 is increased in Step S8 and then the process returns to Step S5.

Accordingly, in the phasing method and the phasing device for a threaded grinding wheel according to the present invention, the threaded grinding wheel 14 is phased with the disc dresser 32 prior to the engagement of the threaded grinding wheel 14 with the disc dresser 32 during dressing. In performing this phasing, a determination is made whether or not the threaded grinding wheel 14 has come into contact with the disc dresser 32, on the basis of the voltage V corresponding to the amplitude of the elastic waves generated in the threaded grinding wheel 14 when the threaded grinding wheel 14 has come into contact with the disc dresser 32. In a case where the voltage V does not exceed a threshold value Vo even if the threaded grinding wheel 14 comes into contact with the disc dresser 32, then the number of rotations of the disc dresser 32 is increased and a determination is forcibly made that the contact has occurred. Subsequently, the threaded grinding wheel 14 is positioned, on the basis of the resulting phase thereof, in an intermediate phase where the engagement is feasible.

Industrial Applicability

The present invention can be applied to a gear grinding machine which enables a reduction of non-machining time.

The invention claimed is:

1. A phasing method for a threaded grinding wheel, in which the threaded grinding wheel is phased with a dresser prior to the engagement of the threaded grinding wheel with the dresser during dressing, the method characterized by comprising:
   rotating the threaded grinding wheel in one direction;
   detecting elastic waves generated when one of thread surfaces of the threaded grinding wheel comes into contact with a corresponding one of blade surfaces of the dresser;
   increasing the number of rotations of the dresser until a measured value on one direction side corresponding to the elastic waves exceeds a predetermined value in a case where the measured value on the one direction side does not exceed the predetermined value even if the threaded grinding wheel comes into contact with the dresser;
   storing a phase on the one direction side of the threaded grinding wheel once the measured value on the one direction side exceeds the predetermined value;
   rotating the threaded grinding wheel in the other direction;
   detecting elastic waves generated when the other one of the thread surfaces of the threaded grinding wheel comes into contact with the other one of the blade surfaces of the dresser;
   increasing the number of rotations of the dresser until a measured value on the other direction side corresponding to the elastic waves exceeds the predetermined value in a case where the measured value on the other direction side does not exceed the predetermined value even if the threaded grinding wheel comes into contact with the dresser;
   storing a phase on the other direction side of the threaded grinding wheel once the measured value on the other direction side exceeds the predetermined value; and positioning the threaded grinding wheel at a phase where the engagement is feasible, on the basis of the phase on the one direction side and the phase on the other direction side of the threaded grinding wheel.

2. A phasing device for a threaded grinding wheel, with which the threaded grinding wheel is phased with a dresser prior to the engagement of the threaded grinding wheel with the dresser during dressing, the device characterized by comprising:

detection means for detecting elastic waves generated when the threaded grinding wheel rotates and comes into contact with the dresser;

determination means for determining that the threaded grinding wheel has come into contact with the dresser in a case where a measured value corresponding to the elastic waves detected by the detection means exceeds a predetermined value;

dresser rotation number setting means for setting the number of rotations of the dresser so that the measured value exceeds the predetermined value, in a case where the threaded grinding wheel comes into contact with the dresser and the measured value does not exceed the predetermined value; and grinding wheel phase control means for positioning the threaded grinding wheel at a phase where the engagement is feasible, on the basis of the phase of the threaded grinding wheel when the detection means determines that the contact has occurred.

3. The phasing device for a threaded grinding wheel according to claim 2, characterized in that the dresser rotation number setting means increases the number of rotations of the dresser in a stepwise manner.

* * * * *